(12) United States Patent
Osika et al.

(10) Patent No.: US 10,174,802 B2
(45) Date of Patent: Jan. 8, 2019

(54) HYDRAULIC DAMPER WITH A HYDRAULIC STOP ARRANGEMENT

(71) Applicant: BeijingWest Industries Co., Ltd., Beijing (CN)

(72) Inventors: Miroslaw Pawel Osika, Cracow (PL); Karol Jakub Pilawski, Cracow (PL); Jakub Pawel Schab, Cracow (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 0 days.

(21) Appl. No.: 15/487,370

(22) Filed: Apr. 13, 2017

(65) Prior Publication Data

US 2017/0328438 A1    Nov. 16, 2017

Related U.S. Application Data

(60) Provisional application No. 62/334,601, filed on May 11, 2016.

(51) Int. Cl.
*F16F 9/49* (2006.01)
*F16F 9/48* (2006.01)
(Continued)

(52) U.S. Cl.
CPC .............. *F16F 9/48* (2013.01); *B60G 13/08* (2013.01); *B60G 15/06* (2013.01); *B60G 15/061* (2013.01);
(Continued)

(58) Field of Classification Search
CPC .... F16F 9/48; F16F 9/49; F16F 9/3257; F16F 9/5126; F16F 9/3271; F16F 9/3235; B60G 13/08
See application file for complete search history.

(56) References Cited

U.S. PATENT DOCUMENTS

| 1,866,167 A | 7/1932 | Lolley |
| 2,719,612 A | 10/1955 | Bourcier De Carbon De Previnquieres |

(Continued)

FOREIGN PATENT DOCUMENTS

| CN | 103953676 | 7/2014 |
| CN | 104204601 | 12/2014 |

(Continued)

OTHER PUBLICATIONS

European Search Report dated Oct. 5, 2017 (8 Pages).
First Office Action and Search Report in Counterpart Chinese Application No. 201710281849.4 dated May 18, 2018.

*Primary Examiner* — Thomas J Williams
*Assistant Examiner* — James K Hsiao
(74) *Attorney, Agent, or Firm* — William H. Honaker; Dickinson Wright PLLC

(57) ABSTRACT

A hydraulic damper including a tube defining a chamber. The tube has a main section and a narrowed section. A main piston assembly is disposed in the main section and connected to a piston rod. A resisting mechanism is fixed to the piston rod. A secondary piston is moveable into the narrowed section. An inner surface of the secondary piston defines at least one radially internal channel. The piston rod defines an annular recess. The secondary piston includes a locking mechanism axially slideable within the annular recess. The secondary piston is axially moveable between a hydraulic stop engagement stroke wherein the secondary piston engages the resisting mechanism and restricts the flow of fluid through the radially internal channel, and a hydraulic stop disengagement stroke wherein the secondary piston is spaced from the resisting mechanism and allows the flow of fluid through radially internal channel.

13 Claims, 3 Drawing Sheets

(51) Int. Cl.
  *B60G 13/08* (2006.01)
  *B60G 15/06* (2006.01)
  *B60G 17/08* (2006.01)
  *F16F 9/18* (2006.01)
  *F16F 9/32* (2006.01)
  *F16F 13/00* (2006.01)
  *F16F 13/06* (2006.01)

(52) U.S. Cl.
  CPC .............. *B60G 17/08* (2013.01); *F16F 9/185* (2013.01); *F16F 9/3214* (2013.01); *F16F 9/3235* (2013.01); *F16F 9/49* (2013.01); *F16F 13/007* (2013.01); *F16F 13/06* (2013.01); *B60G 2202/24* (2013.01); *B60G 2206/41* (2013.01); *B60G 2500/10* (2013.01); *B60G 2800/162* (2013.01); *F16F 2222/12* (2013.01); *F16F 2224/02* (2013.01); *F16F 2228/066* (2013.01)

(56) References Cited

U.S. PATENT DOCUMENTS

| | | |
|---|---|---|
| 3,447,644 A | 6/1969 | Duckett |
| 3,722,920 A | 3/1973 | Reese |
| 3,747,714 A | 7/1973 | DeCarbon |
| 3,794,309 A | 2/1974 | Chrokey et al. |
| 4,280,601 A | 7/1981 | Patriquin |
| 5,070,971 A | 12/1991 | Dourson et al. |
| 9,765,842 B2 * | 9/2017 | Noguchi .................. F16F 9/48 |
| 9,835,220 B2 * | 12/2017 | Kontny .................. F16F 9/585 |
| 9,909,638 B2 * | 3/2018 | Chyla .................... F16F 9/516 |
| 2004/0231934 A1 * | 11/2004 | Heo ...................... F16F 9/3405 188/284 |
| 2005/0167220 A1 | 8/2005 | May et al. |
| 2006/0049014 A1 * | 3/2006 | Vanspauwen ............ F16F 9/49 188/284 |
| 2007/0137957 A1 | 6/2007 | Carlstedt et al. |
| 2009/0038898 A1 * | 2/2009 | Zeissner ................. F16F 1/328 188/312 |
| 2009/0127041 A1 * | 5/2009 | Denner .................. F16F 9/5126 188/282.1 |
| 2010/0162521 A1 | 7/2010 | Pyo |
| 2012/0090903 A1 | 4/2012 | Krazewski et al. |
| 2012/0090931 A1 | 4/2012 | Krazewski et al. |
| 2012/0138399 A1 | 6/2012 | Lopez, Jr. et al. |
| 2013/0305919 A1 * | 11/2013 | Frey ...................... F16F 9/3214 92/181 P |
| 2014/0291086 A1 * | 10/2014 | Suzuki ................... F16F 9/066 188/269 |
| 2014/0360353 A1 * | 12/2014 | Baalmann ................ F16F 9/49 92/143 |
| 2015/0090548 A1 * | 4/2015 | Yamanaka ............ F16F 9/3221 188/297 |
| 2015/0233442 A1 * | 8/2015 | Noguchi .................. F16F 9/48 188/284 |
| 2015/0247549 A1 | 9/2015 | Takeno et al. |
| 2016/0091046 A1 * | 3/2016 | Soromenho ............... F16F 9/49 188/297 |

FOREIGN PATENT DOCUMENTS

| | | |
|---|---|---|
| CN | 104565172 | 4/2015 |
| CN | 105370789 | 3/2016 |
| DE | 1635388 | 3/1952 |
| DE | 22910104 | 8/2000 |
| EP | 1717478 | 3/2006 |
| EP | 2302252 | 3/2011 |
| EP | 2302252 | 11/2012 |
| EP | 2952775 | 9/2015 |
| JP | 2013060721 | 4/2013 |
| KR | 20130086185 | 7/2013 |
| WO | 9417317 | 8/1994 |

\* cited by examiner

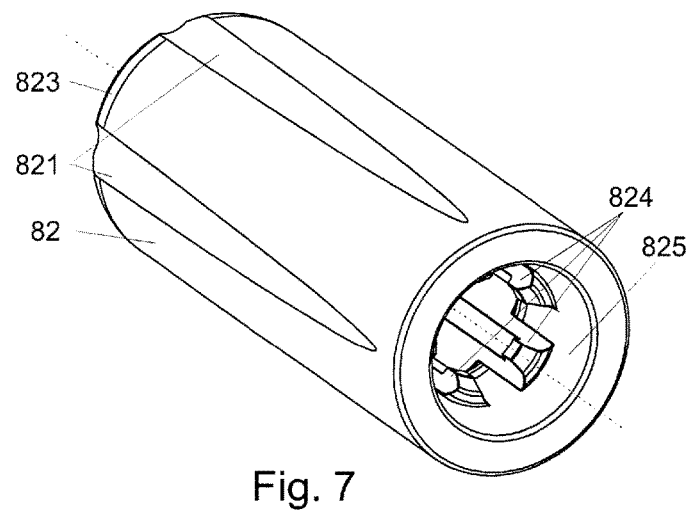
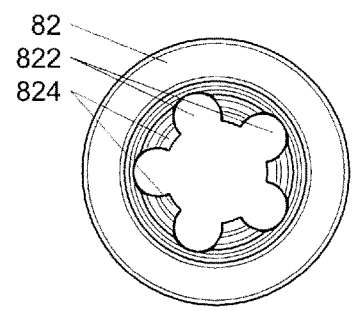
Fig. 7  Fig. 8
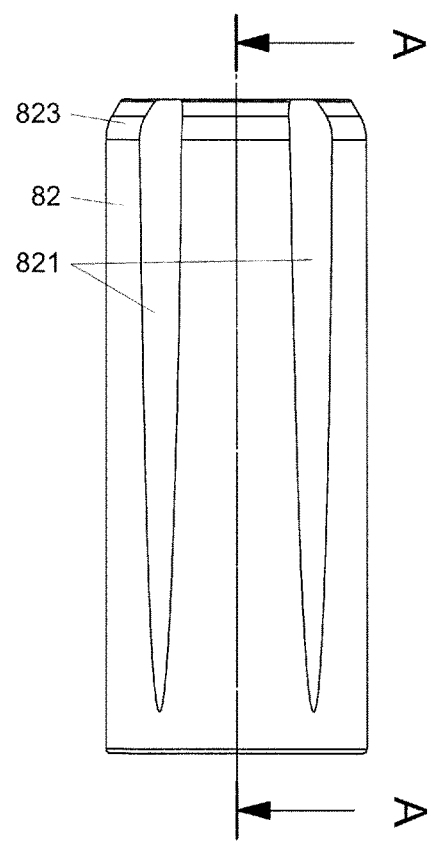
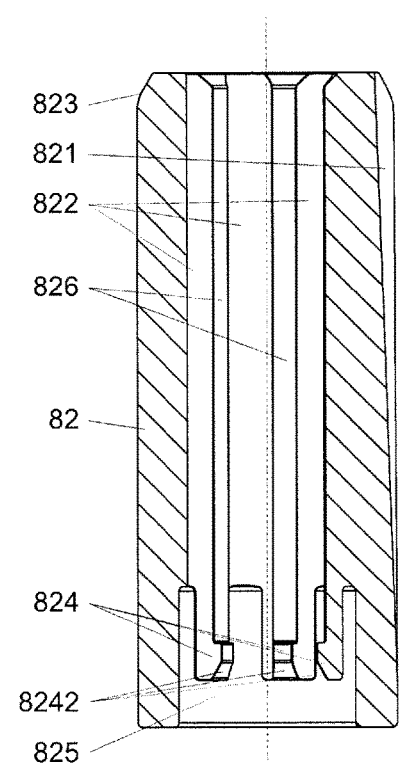
Fig. 9  Fig. 10

HYDRAULIC DAMPER WITH A HYDRAULIC STOP ARRANGEMENT

CROSS REFERENCE TO RELATED APPLICATION

This application claims the benefit of U.S. Provisional Patent Application Ser. No. 62/334,601 filed on May 11, 2016, and titled "HYDRAULIC DAMPER WITH A HYDRAULIC STOP ARRANGEMENT", the entire disclosure of which is hereby incorporated by reference.

TECHNICAL FIELD

The invention relates to a hydraulic damper for a vehicle. More particularly, the invention relates to a hydraulic damper for a vehicle including a main piston assembly and a secondary piston assembly providing a hydraulic stop arrangement.

BACKGROUND OF THE INVENTION

It is known in the art for hydraulic dampers to include a main piston assembly in a main section of a tube of the damper, and a secondary piston assembly in a narrowed section of the tube. The secondary piston assembly forms a so called hydraulic stop arrangement that generates additional damping force over a predefined end section of an operating range of piston rod travel. Exemplary dampers provided with such a hydraulic stop arrangements are disclosed in U.S. Pat. No. 3,447,644 and European Patent Application Publication Nos. EP 2 302 252 and EP 2 952 775.

Such hydraulic stop arrangements provide dissipation of energy at the end of the stroke and enable the generation of an additional damping force depending mainly on the position of the piston rod. They also provide a progressive increase of damping force in dependence of the rod displacement.

Nonetheless many of these constructions are complicated in terms of design, assembly process and/or labor consumption.

Therefore it is an object of the present invention to provide a hydraulic damper with a hydraulic stop arrangement that has a simple and cost efficient construction, has very few components, and is easy to assemble and requires only minor modifications of the other components of an existing damper assembly to be implemented thereon.

SUMMARY OF THE INVENTION

According to an aspect of the disclosure, a hydraulic damper is provided for a motor vehicle. The hydraulic damper includes a tube extending along an axis and defining a chamber for holding a fluid. The tube has a main section having a first diameter and a narrowed section having a second diameter being smaller than the first diameter. A main piston assembly is disposed in the main section of the tube and is axially slideable within the main section of the tube to generate a damping force. A piston rod is attached to the main piston assembly and extends axially outside of the tube. A resisting mechanism is disposed about and fixed to the piston rod. A secondary piston is disposed about the piston rod on the axially opposite side of the resisting mechanism as the main piston assembly and has an external diameter substantially corresponding to the second diameter of the narrowed section of the tube and is axially displaceable with the main piston assembly and moveable into the narrowed section of the tube to generate an additional damping force. The secondary piston defines a radially inner surface engaging the piston rod and a radially outer surface opposite the radially inner surface. The radially inner surface defines at least one radially internal channel extending axially. The piston rod defines an annular recess at least partially in axial alignment with the secondary piston. The secondary piston includes at least one locking mechanism positioned in the annular recess of the piston rod and axially slideable within the annular recess. The secondary piston is axially moveable between a hydraulic stop engagement stroke and a hydraulic stop disengagement stroke, wherein the secondary piston axially engages the resisting mechanism and restricts the flow of working fluid through the at least one radially internal channel during the hydraulic stop engagement stroke, and wherein the secondary piston is axially spaced from the resisting mechanism and defines an annular channel between the piston rod and the secondary piston allowing the flow of working fluid through the at least one radially internal channel during the hydraulic stop disengagement stroke.

The secondary piston requires very few components, thus significantly decreasing manufacturing costs and providing a simple assembly process of the hydraulic damper. Moreover, no significant modifications of the piston rod are required to utilize the secondary piston, and thus the secondary piston may be employed in a variety of existing dampers. In particular, the annular recesses of the piston rod may be formed by simple machining of the rod.

According to another aspect of the disclosure, the radially outer surface of the secondary piston defines a plurality of radially external channels that each extend axially. Accordingly, no channels formed in the narrowed section of a damper tube are required to decrease an abrupt increase of an additional damping force generated in the phase of an entry of the secondary piston into the narrowed section.

According to another aspect of the disclosure, a cross-sectional surface of the radially external channels of the secondary piston in a plane perpendicular to the axis is the largest at its face opposite the resisting mechanism and decreases along the axial length of the secondary piston. Accordingly, the damping force generated by the secondary piston while it engages the narrowed section increases smoothly and progressively.

According to another aspect of the disclosure, a plurality of radially internal bridges extending axially are defined between the radially internal channels, each of the axially extending bridges terminates axially at one of the hooks, and the secondary piston defines a chamber about the hooks.

According to another aspect of the disclosure, each of the hooks includes a flat surface extending perpendicularly to the axis, and a conical surface extending at an angle relative to the flat surface. Such a shaping of the hooks facilitates positioning the secondary piston over the piston rod during assembling the damper. More particularly, the conical surfaces of the hooks may yield allowing for simple drawing of the piston down over the rod until the front flat surfaces of the hooks engage the annular recess of the piston rod.

According to another aspect of the disclosure, an end of the secondary piston defines a convex guiding surface, thus decreasing possible mechanical stresses affecting the damper components during an engagement stroke.

According to another aspect of the disclosure, the secondary piston is of a plastic material. Accordingly, it may therefore be manufactured with high cost efficiency, such as by utilizing a molding technique like injection molding.

According to another aspect of the disclosure, the resisting mechanism is a retaining ring that is fixed in the annular recess of the piston rod. Such a ring makes assembly of the secondary piston very simple.

According to another aspect of the disclosure, at least one spring is disposed in the narrowed section of the tube for axially engaging the secondary piston to generate an additional damping force. According to yet a further aspect of the disclosure, at least one bumper is positioned in the narrowed section of the tube for axially engaging the secondary piston to generate an additional damping force. The spring and/or bumper provide the generation of an additional damping force at the end of an engagement stroke, thus further improving the tunability of the hydraulic stop of the present invention.

According to another aspect of the disclosure, the tube extends axially between a compression end and a rebound end, and the narrowed section is located at the rebound end of the tube.

According to another aspect of the disclosure, the damper assembly is a twin-tube damper.

According to an aspect of the disclosure, the at least one axial slot is defined in the narrowed section of the tube. Accordingly, a smooth and adjustable increase of damping force is provided while the secondary piston assembly enters the narrowed section of the tube.

The damper assembly according to the present invention may easily be configured to generate additional damping forces, both for compression and rebound strokes enabling for wide range tuning of force gains, wherein the performance of the arrangement may depend both on the piston position as well as on the piston velocity.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 7 illustrates the secondary piston shown in FIG. 5 in perspective rear view;

FIG. 8 illustrates the secondary piston shown in FIG. 5 in rear view;

FIG. 9 illustrates the secondary piston shown in FIG. 5 in side view; and

FIG. 10 illustrates the secondary piston shown in FIG. 5 in axial cross-section along the plane A-A shown in FIG. 9.

DESCRIPTION OF THE ENABLING EMBODIMENT

Figures 1, 2:
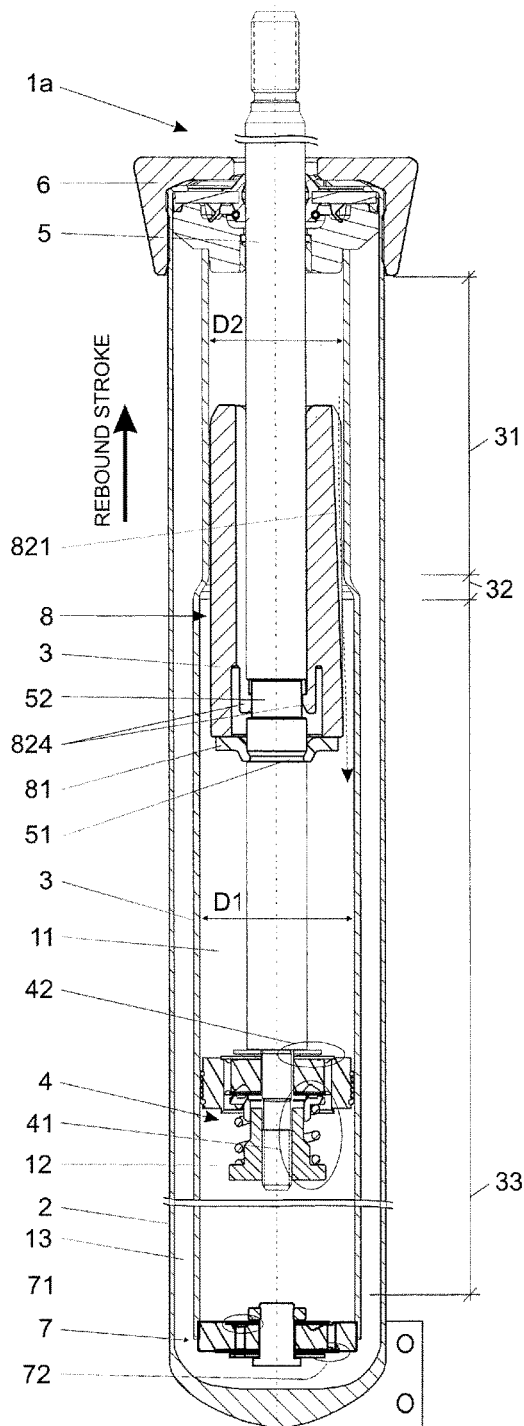
FIG. 1 is a schematic cross-sectional view of an embodiment of a twin-tube damper according to the present invention with a hydraulic rebound stop.
FIG. 2 is a schematic cross-sectional view of a bottom part of an embodiment of a mono-tube damper according to the present invention with a hydraulic compression stop.

Reference numerals to functionally equivalent elements remain the same on all figures of the drawing, wherein where appropriate they are supplemented with additional suffixes (a-d) to differentiate elements of the same functionality but different construction.

FIG. 1 presents an embodiment of a twin-tube damper 1a according to the present invention that may be employed in a typical motor vehicle suspension during a rebound stroke. The damper 1a comprises an external tube 2 and a main tube 3, each extending along an axis and filled with viscous working fluid. A movable main piston assembly 4 is disposed in the main tube 3 and is attached to a piston rod 5 led outside the damper 1a through a sealed piston rod guide 6. The damper 1a is also provided with a base valve assembly 7 fixed at the end of the main tube 3. The piston assembly 4 makes a sliding fit with the inner surface of the main tube 3 and divides the tube 3 into a rebound chamber 11 (between the piston rod guide 6 and the main piston assembly 4) and a compression chamber 12 (between the main piston assembly 4 and the base valve assembly 7). An additional compensation chamber 13 is located at the other side of the base valve assembly 7.

The main piston assembly 4 is provided with compression and rebound valve assemblies 42, 41 to control the flow of working fluid passing between the rebound chamber 11 and the compression chamber 12 while the main piston assembly 4 is in motion. Also, the base valve assembly 7 is provided with rebound and compression valve assemblies 71, 72 to control the flow of working fluid passing between the additional compensation chamber 13 and the compression chamber 12, respectively, during rebound and compression stroke of the damper 1a. Valve assemblies 41, 42 and 71, 72 provide design parameters that may be used to shape desired characteristic of the damper 1a.

Main section 33 of the tube 3 has a first diameter D1 that in the example embodiment amounts to approximately 32 mm. As shown, the tube 3 has also a narrowed cylindrical section 31 of a smaller second diameter D2 that in the example embodiment amounts to approximately 28 mm. This narrowed cylindrical section 31 extends through a conical section 32 into the main cylindrical section 33 of the tube.

A secondary piston assembly 8 is disposed over the piston rod 5 and is displaceable along with the main piston assembly 4. The assembly 8 comprises only two components, namely a resisting mechanism 81, which is shown in the example embodiment as a retaining ring 81 fixed in an annular recess 51 of the piston rod 5, and an additional plastic secondary piston 82 snaplocked over the piston rod 5 in an annular recess 52 of the piston rod 5 and capable of rotational and axial displacement within the limits of this snapping recess 52. The annular recess 52 is defined at least partially in axial alignment with the secondary piston assembly 8. The secondary piston 82 is disposed on the axially opposite side of the resisting mechanism 81 as the main piston assembly 4. The secondary piston 82 has a substantially tubular shape having a radially inner surface 87 having an internal diameter substantially corresponding to the diameter of the piston rod 5 and a radially outer surface 89 having an external diameter substantially corresponding to the diameter of the narrowed cylindrical section 31 of the tube 3.

The radially outer surface 89 of the piston 82 is also provided with a number of equiangularly spaced radially external channels 821 extending axially and enabling for a tunable flow of working fluid from the narrowed section 31 to the rebound chamber 11 of the tube 3 and further through the rebound valve assembly 41 of the main piston assembly 4 during the rebound stroke as illustrated with a dashed arrow.

Such a shape of the main tube 3 and the secondary piston assembly 8 provide a hydraulic rebound stop for the damper 1*a*. Functionality of such a hydraulic stop shall be explained later, in particular with reference to FIGS. 3 to 10.

FIG. 2 presents another embodiment of a mono-tube damper 1*b* according to the present invention with a hydraulic compression stop of a construction similar to the one illustrated in FIG. 1 during a rebound stroke. As shown in FIG. 2, a narrowed cylindrical section 31 of a damper tube 3 is located at the compression end of the tube 3 and an secondary piston assembly 8 is fixed to the damper piston rod 5 at the compression side of the main piston assembly 4. As shown, the pressure of working fluid forced the secondary piston 82 to slide down in the annular snapping recess 52 away of the retaining ring 81. Nonetheless, in an illustrated position, the secondary piston 82 is in the main section 33 of the tube 3 and working fluid flows through the rebound valve assembly 41 of the main piston assembly 4 and further down the compression chamber 12 freely around the secondary piston 82 as illustrated with dashed arrows.

In this embodiment, the conical section of the tube is separated with six equiangularly spaced axial slots 321 stamped from the outside of the tube 3 and separated with six axial bridges 322. As a result, the conical section of the tube 3 comprises a semi-cylindrical section 32*b* formed by six equiangularly spaced cylindrical sections of the bridges 322, and a semi-conical section 32*a* formed by six equiangularly spaced conical sections of the bridges 322. Semi-cylindrical section 32*b* provides guidance for the secondary piston assembly 8 while retaining the slots 321. Such a shaping also provides smooth built-up of the damping force between the main cylindrical section 33 and the narrowed cylindrical section 31 of the tube 3 and possible abrupt force peak is thus avoided.

A slidable diaphragm 9 separates the damper compression chamber 12 from an additional gas compensation chamber 14. Furthermore, the tube comprises a cap 34 screwed on the end of the main tube 3. A valve 341 is provided on the cap 34, which provides for filling the gas compensation chamber 14 with gas after assembly of the damper.

Obviously, a damper according to the present invention may contain two hydraulic stops, each provided with an additional plastic piston, both at the compression and at the rebound side of the damper.

Figure 3:
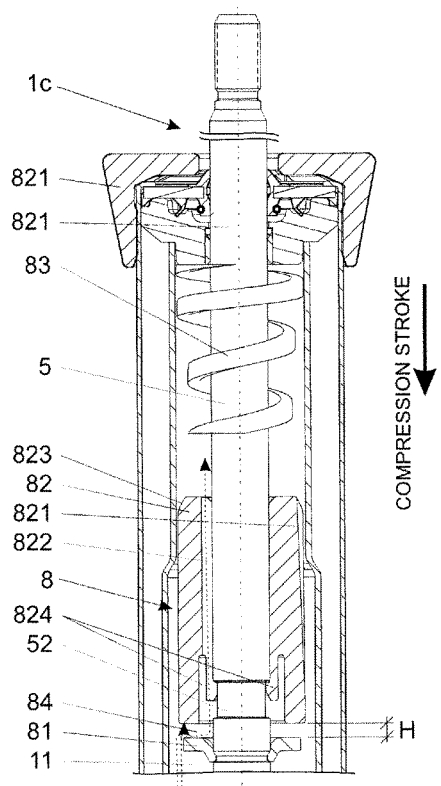
FIG. 3 is a schematic cross-sectional view of another embodiment of a twin-tube damper according to the present invention with a hydraulic rebound stop.

FIG. 3 illustrates another embodiment of a twin-tube damper 1*c* provided with a hydraulic rebound stop comprising an additional spring 83 during a compression stroke. One end of the spring 83 is attached to the piston rod guide 6 and the spring 83 is capable of generating additional damping force after it is engaged by the front face of the secondary piston 82 at the end of the rebound stoke. Obviously, this force substantially linearly increases with the further increase of the rebound stroke travel.

As used above and below, the term "front" means the side of the secondary piston assembly 8 that engages the narrowed section 31 of the tube, while the term "rear" means the side of the secondary piston assembly 8 which is axially opposite the front side. Similarly the term "engagement stroke" denotes this stroke of the damper during which the secondary piston assembly may enter into the narrowed section 31 of the tube 3, while the term "disengagement stroke" denotes the stroke opposite to the engagement stroke.

As shown, the pressure of working fluid under the secondary piston 82 forces it to slide up in the annular snapping recess 52 away of the retaining ring 81, thus forming an annular channel 84 of height H between the rear face of the secondary piston 82 and the front face of the retaining ring 81. Therefore, working fluid flows freely from the rebound chamber 11 through this annular channel 84 and further through radially inner axial channels 822 (cf. FIG. 10) defined by the radially inner surface 87 of the secondary piston 82 to the narrowed section 31 of the tube 3 as illustrated with dashed arrows.

Figure 4:
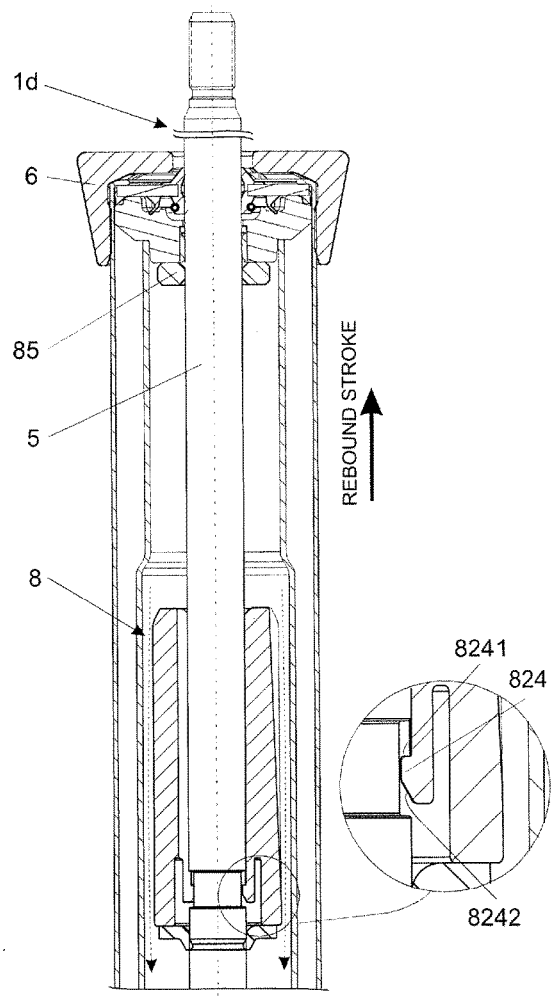
FIG. 4 is a schematic cross-sectional view of yet another embodiment of a twin-tube damper according to the present invention with a hydraulic rebound stop.
Figure 5:
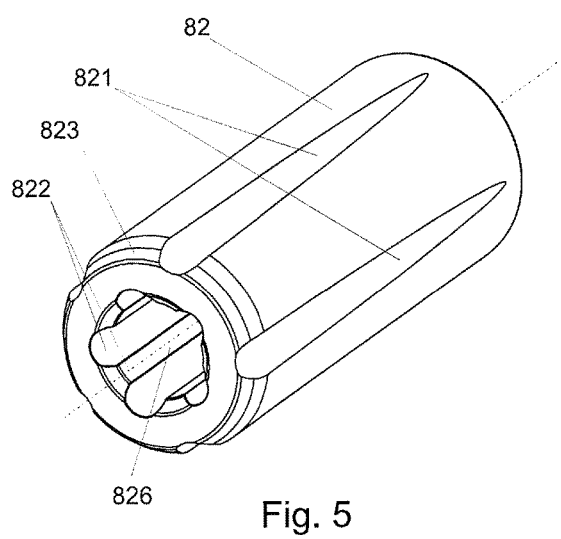
FIG. 5 illustrates an embodiment of an secondary piston in perspective front view.
Figure 6:
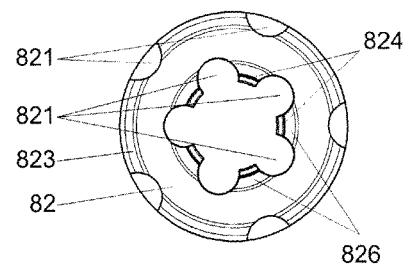
FIG. 6 illustrates the secondary piston shown in FIG. 5 in front view.

FIG. 4 illustrates another embodiment of a twin-tube damper 1*d* provided with a hydraulic rebound stop 8 comprising an additional bumper 85 during a rebound stroke. The bumper 85 is attached to the piston rod guide 6 and is elastically deformable and thus capable of generating additional damping force after it is engaged by the front face of the secondary piston 82 at the end of the rebound stoke in order to protect the plastic secondary piston 82 from damaging.

Obviously, as shown in FIG. 2, in order to generate and adjust the characteristic of the additional damping force generation it is possible to employ both the radially external channels 821 of the piston 82, as well as the axial slots 321 provided across the conical section 32 of the tube 3. In this case however, rotation of the secondary piston 82 over the piston rod 5 should be blocked, e.g., by an axial recess of the piston rod 5 engaging appropriate protrusions of the secondary piston 82 (not shown in the drawing).

The embodiment of the secondary piston 82 shown in FIGS. 5 to 10 is provided with five equiangularly spaced radially external channels 821 and five equiangularly spaced radially internal channels 822.

In this embodiment the radially external channels 821 have a form of arched grooves and their cross-sectional surface in a plane perpendicular to the piston 82 axis progressively increases starting at a certain point along the piston 82 length toward the front side thereof, thus providing convenient tuning parameters for the secondary piston assembly 8. When the secondary piston 82 enters the narrowed section 31 of the tube 3 this cross-sectional surface of the radially external channels 821 is the largest, providing substantially small restrictions for the flow of working fluid. As the secondary piston 82 enters further into the narrowed section 31 this cross-sectional surface diminishes and thus damping force becomes higher, up to the point when the flow of working fluid is possible only through a narrow annular slot between the outer surface of the secondary piston 82 now devoid of the radially external channels 821 and the inner surface of the narrowed section 31. In this point, the flow restrictions and thus the damping force is obviously the highest.

The secondary piston 82 is also provided with a convex guiding surface 823 providing guidance for the piston 82 while entering the narrowed section 31 of the tube and compensating for its possible radial intolerances, as for the free sliding movement of the piston 82 over the piston rod 5 some annular gap between the piston 82 and the piston rod 5 must be provided.

In this embodiment the radially internal channels 822 also are formed as arched grooves, but their cross-sectional surface is substantially the same over their length and the channels 822 are delimited by radially internal bridges 826.

At the rear side of the piston 82 the bridges 826 protrude into an internal chamber 825 and are terminated with at least one locking mechanism 824 capable of engaging the rod 5 in the annular snapping recess 52 of the rod 5. In the example embodiment, the locking mechanism 824 includes a plurality of hooks 824 that are axially slideably within the annular recess 52. Rear surfaces of the hooks 824 are substantially conical while the front surfaces are substantially perpendicular to the damper and the piston rod 5 axis. Such a shaping facilitates positioning the piston 82 over the piston rod 5 prior assembling the piston rod 5 inside the damper 1. Rear conical surfaces of the hooks 824 may yield inside the internal chamber 825 allowing for simple drawing the piston 82 down over the piston rod 5 until the hooks 824 engage the recess 52. Further sliding movement of the piston 82 down or during the engagement stroke is blocked by the retaining ring, while front surfaces of the hooks 824 perpendicular to the damper piston rod 5 axis prevents the piston 82 from sliding up during the hydraulic stop engagement stroke.

As shown in FIG. 1 and FIG. 4 during the engagement, in this case rebound, stroke of the damper, the secondary piston assembly 8 may enter the narrowed section 31 of the tube 3 through the conical section 32. During this stroke, the retaining ring 81 pushes the secondary piston 82 and blocks the entrances of the radially internal channels 822.

On the other hand, during the disengagement stroke shown in FIG. 2 and FIG. 3, the pressure of working fluid pushes the secondary piston 82 away of the retaining ring 81 allowing for a substantially unrestricted flow of the fluid through thus formed annular channel 84 and the radially internal channels 822.

The above embodiments of the present invention are merely exemplary. The figures are not necessarily to scale, and some features may be exaggerated or minimized. These and other factors however should not be considered as limiting the spirit of the invention, the intended scope of protection of which is indicated in appended claims.

What is claimed is:

1. A hydraulic damper for a motor vehicle comprising:
a tube extending along an axis and defining a chamber for holding a fluid;
said tube having a main section having a first diameter and a narrowed section having a second diameter being smaller than said first diameter;
a main piston assembly disposed in said main section of said tube and axially slideable within said main section of said tube to generate a damping force;
a piston rod attached to said main piston assembly and extending axially outside of said tube;
a resisting mechanism disposed about and fixed to said piston rod;
a secondary piston disposed about said piston rod on the axially opposite side of said resisting mechanism as said main piston assembly and having an external diameter substantially corresponding to said second diameter of said narrowed section of said tube and axially displaceable with said main piston assembly and moveable into said narrowed section of said tube to generate an additional damping force;
said secondary piston defining a radially inner surface engaging said piston rod and a radially outer surface opposite said radially inner surface;
said radially inner surface defining at least one radially internal channel extending axially;
said piston rod defining an annular recess at least partially in axial alignment with said secondary piston; and
said secondary piston including at least one locking mechanism positioned in said annular recess of said piston rod and axially slideable within said annular recess;
wherein said secondary piston is axially moveable between a hydraulic stop engagement stroke and a hydraulic stop disengagement stroke, wherein said secondary piston axially engages said resisting mechanism and restricts the flow of working fluid through said at least one radially internal channel during said hydraulic stop engagement stroke, and wherein said secondary piston is axially spaced from said resisting mechanism and defines an annular channel between said piston rod and said secondary piston opening flow of working fluid through said at least one internal channel during said hydraulic stop disengagement stroke, wherein said radially outer surface of said secondary piston defines a plurality of radially external channels each extending axially.

2. A hydraulic damper as set forth in claim 1, wherein a cross-sectional surface of said radially external channels of said secondary piston in a plane perpendicular to said axis is the largest at its face opposite to the resisting mechanism and decreases along the axial length of said secondary piston.

3. A hydraulic damper as set forth in claim 1, wherein said locking mechanism of said secondary piston includes a plurality of radially internal elastic hooks.

4. A hydraulic damper as set forth in claim 3, wherein a plurality of radially internal bridges extending axially are defined between said radially internal channels, wherein each of said axially extending bridges terminates axially at one of said hooks, and wherein said secondary piston defines a chamber about said hooks.

5. A hydraulic damper as set forth in claim 3, wherein each of said hooks includes a flat surface extending perpendicular to said axis and a conical surface extending at an angle relative to said flat surface.

6. A hydraulic damper as set forth in claim 1, wherein an end of said secondary piston defines a convex guiding surface.

7. A hydraulic damper as set forth in claim 1, wherein said secondary piston is of a plastic material.

8. A hydraulic damper as set forth in claim 1, wherein said resisting mechanism is a retaining ring being fixed in said annular recess of said piston rod.

9. A hydraulic damper as set forth in claim 1, further including at least one spring disposed in said narrowed section of said tube for axially engaging said secondary piston to generate an additional damping force.

10. A hydraulic damper as set forth in claim 1, further including at least one bumper in said narrowed section of said tube for axially engaging said secondary piston to generate an additional damping force.

11. A hydraulic damper as set forth in claim 1, wherein said tube extends axially between a compression end and a rebound end, and wherein said narrowed section is located at said rebound end of said tube.

12. A hydraulic damper as set forth in claim 1, wherein said damper assembly is a twin-tube damper.

13. A hydraulic damper as set forth in claim 1, wherein at least one axial slot is defined in said narrowed section of said tube.

* * * * *